(12) United States Patent
Smetana

(10) Patent No.: US 7,146,517 B2
(45) Date of Patent: Dec. 5, 2006

(54) CLOCK PULSE SHAVER WITH SELECTIVE ENABLE PULSE WIDTH

(75) Inventor: Stephen B. Smetana, Eau Claire, WI (US)

(73) Assignee: Cray, Inc., Seattle, WA (US)

(*) Notice: Subject to any disclaimer, the term of this patent is extended or adjusted under 35 U.S.C. 154(b) by 329 days.

(21) Appl. No.: 10/137,060

(22) Filed: May 2, 2002

(65) Prior Publication Data
US 2003/0208702 A1 Nov. 6, 2003

(51) Int. Cl.
G06F 1/04 (2006.01)

(52) U.S. Cl. ......................... 713/500; 713/401

(58) Field of Classification Search ................ 713/500, 713/401
See application file for complete search history.

(56) References Cited

U.S. PATENT DOCUMENTS

| | | | | |
|---|---|---|---|---|
| 5,258,660 A | * | 11/1993 | Nelson et al. | 327/141 |
| 5,333,154 A | * | 7/1994 | Hengeveld et al. | 375/354 |
| 5,414,381 A | * | 5/1995 | Nelson et al. | 327/262 |
| 5,467,040 A | * | 11/1995 | Nelson et al. | 327/276 |
| 5,944,835 A | * | 8/1999 | Lusinchi et al. | 713/501 |
| 6,651,179 B1 | * | 11/2003 | Sato et al. | 713/401 |
| 6,714,438 B1 | * | 3/2004 | Kawabata | 365/154 |
| 6,753,695 B1 | * | 6/2004 | Toda et al. | 326/29 |
| 2001/0045850 A1 | * | 11/2001 | Kuroda | 327/157 |
| 2003/0034800 A1 | * | 2/2003 | Masleid | 326/93 |
| 2003/0119465 A1 | * | 6/2003 | Martin et al. | 455/260 |

* cited by examiner

Primary Examiner—Lynne H. Browne
Assistant Examiner—Tse Chen
(74) Attorney, Agent, or Firm—Schwegman, Lundberg, Woessner & Kluth, P.A.

(57) ABSTRACT

A clock for a computing system. The clock includes a first pulse shaver and a first pin connected to the first pulse shaver. The first pin selectively enables the first pulse shaver to reduce the width of enabling pulses in a clock signal passing through the first pulse shaver. A method for synchronizing data flow in a computing system. The method includes generating pulses; selectively reducing the width of the pulses; and delivering the pulses to a memory element.

20 Claims, 3 Drawing Sheets

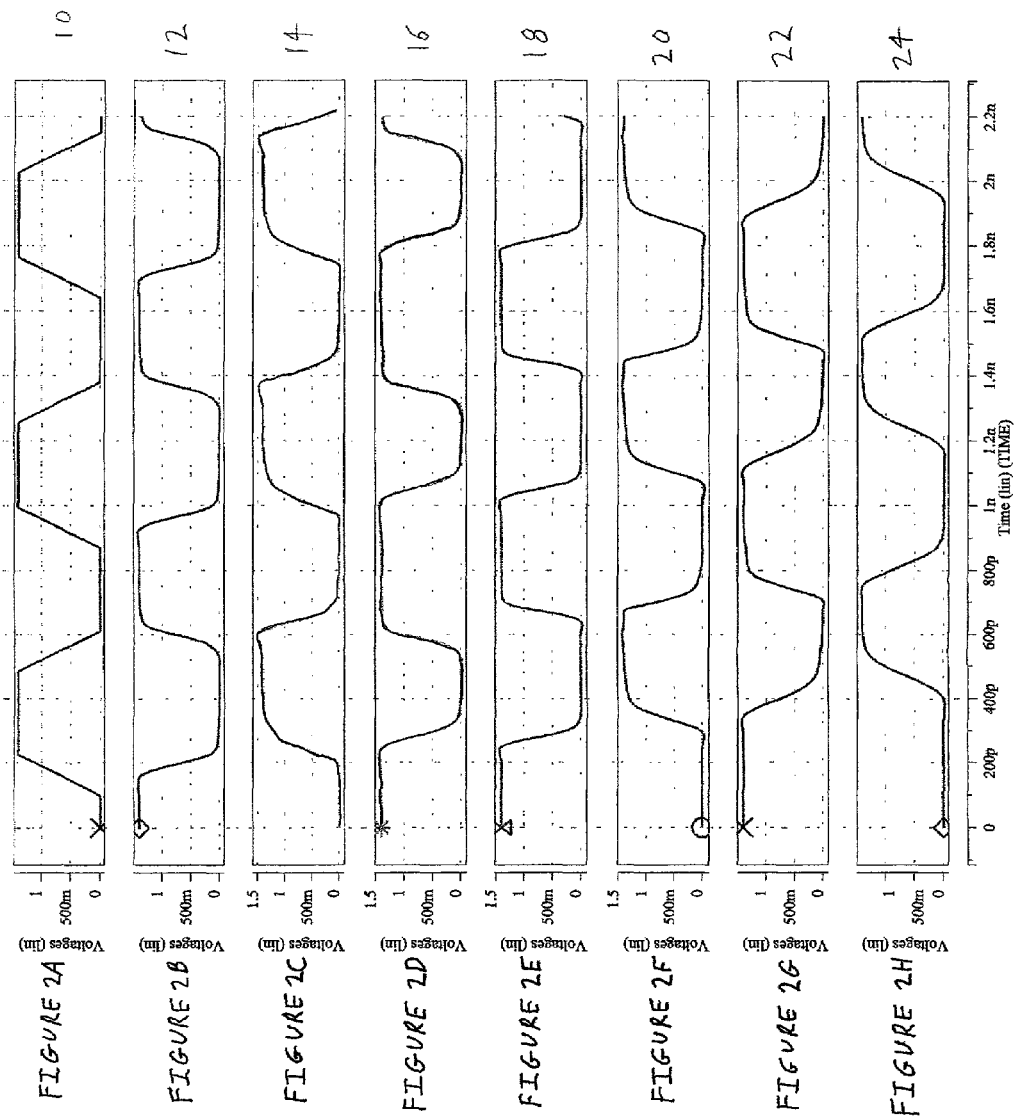

CLOCK PULSE SHAVER WITH SELECTIVE ENABLE PULSE WIDTH

FIELD OF THE INVENTION

This invention relates generally to the field of communicating digital information, and more particularly to a method of selectively shaving clock signals in a computing system.

BACKGROUND

Clock signals synchronize data signals so they move properly from one stage of logic to the next. Error-free communication of data signals between components of a computing system is critical. Communication error may be caused by many factors.

A minimum-path (i.e. "min-path") problem occurs if clock signals allow data to race through too many stages of logic. Min-path problems happen because the enabling pulse widths of the clock signal are too large. The problem is exacerbated because the transmittal rates between components in computing systems are effected by variations in the fabrication process for the individual components. Therefore, computing systems are often designed assuming a worst-case transmittal rate even though the actual transmittal rate may be much faster.

A min-path problem can not be solved by slowing down the clock frequency because the enabling pulse widths become even larger. In addition, slowing down the clock frequency would adversely effect computer system performance.

Speeding up the clock frequency could be used to reduce pulse width. However, a maximum-path (i.e. "max-path") problem might occur because some logic paths require more time to transfer between circuit elements than the amount of time in a clock pulse width. Therefore, circuit elements will close without catching all of the data in the logic path. Max-path communication problems become even more of a concern as the clock speeds for modern computing systems continue to increase.

The problems discussed above can be addressed by incorporating a clock chopper, or shaver, into the computing system. A clock shaver reduces the width of the enabling pulses without changing the frequency of the clock signal.

One drawback with existing computing systems that include clock shavers is that the clock shavers permanently, or continuously, reduce the enabling clock pulse width. The assortment of components in a computing system often communicate with one another at differing rates. Depending on the type of components in the computing system, continuously reducing the enabling clock pulse width may lead to max-path problems within the computing system.

There is a need in the art for a computing system which reduces data communication error. There is also a need for a computing system that selectively shaves the enabling pulse widths in a clock signal.

SUMMARY OF THE INVENTION

The present invention is directed toward an adaptive computing system that reduces data communication errors. As illustrated in detail below, the computing system selectively reduces enabling clock pulse widths.

In one example embodiment, the present invention relates to a clock for a computing system. The clock includes a first pulse shaver and a first pin connected to the first pulse shaver. The first pin selectively directs the first pulse shaver to reduce the width of clock pulses passing through the first pulse shaver.

In yet another example embodiment, the present invention relates to a method for synchronizing data flow in a computing system. The method includes generating pulses; selectively reducing the width of the pulses; and delivering the pulses to a memory element.

Other features of the invention will become apparent to one of ordinary skill in the art upon reviewing the detailed description and drawings.

BRIEF DESCRIPTION OF THE DRAWINGS

FIGS. 2A–2H are timing diagrams for some of the components in the portion of the clock shown in FIG. 1 when pulses are not being shaved.

DETAILED DESCRIPTION

In the following detailed description, references are made to the accompanying drawings that illustrate specific embodiments in which the invention may be practiced. Electrical, mechanical, programmatic and structural changes may be made without departing from the scope of the present invention.

Figure 1:
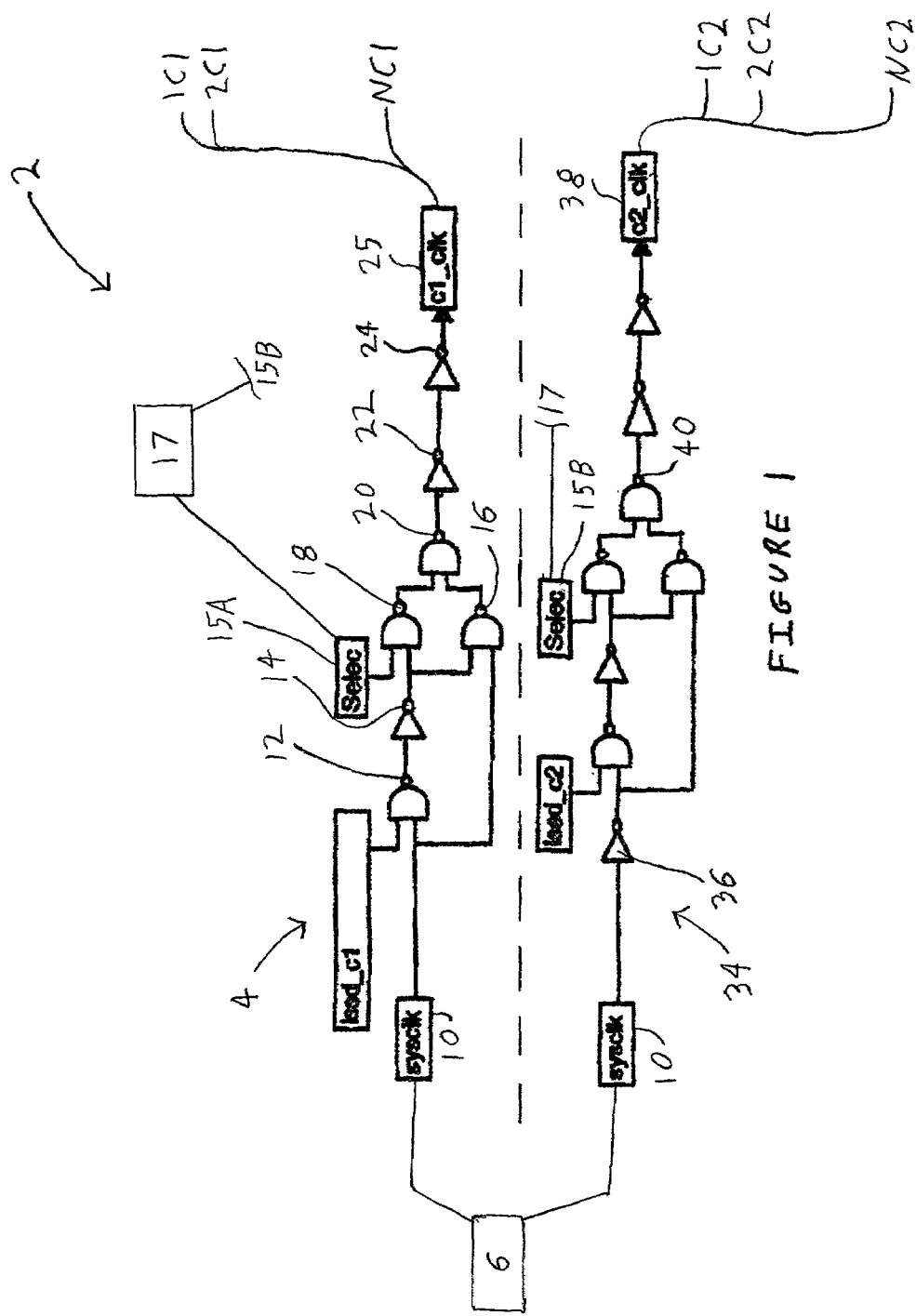
FIG. 1 is a schematic diagram illustrating a portion of a clock in a computer system.

FIG. 1 is a schematic diagram illustrating one embodiment of a clock 2 that is used in a computing system which communicates digital information through latches 1C1-NC1, 1C2-NC2. The digital information is typically communicated between various components, such as processors, memory modules and/or ASICs. Communicating digital data between components often occurs at a variety of different rates such that there may be min-path problems within the computing system. The min-path may be corrected by clock 2 such that a computing system which includes clock 2 may be operated at a variety of rates without requiring redesign.

Clock 2 includes a first pulse shaver 4 and a first pin 15A connected to first pulse shaver 4. First pin 15A selectively enables first pulse shaver 4 to reduce the width of enabling pulses in a clock signal that is delivered through first pulse shaver 4 to latches 1C1-NC1. Clock 2 selectively shaves, or reduces, the enabling pulse widths without changing the frequency of the pulses delivered by clock 2 to latches 1C1-NC1.

In some embodiments, clock 2 includes an oscillator 6, or some other signal-generating means, that generates a clock signal in the form of enabling pulses which are sent to first pulse shaver 4. In addition, first pin 15A may be connected to an external source 17 that delivers selective signals to first pulse shaver 4 through first pin 15A to direct first pulse shaver 4 to shave the enabling pulses.

FIG. 1 shows that some embodiments includes a second pulse shaver 34 and a second pin 15B connected to second pulse shaver 34. Second pin 15B selectively enables second pulse shaver 34 to reduce the width of the enabling pulses in the clock signal that is generated by oscillator 6 and delivered through second pulse shaver 34 to input ports on latches 1C2-NC2. Second pulse shaver 34 similarly selectively shaves, or reduces, the enabling pulse widths without changing the frequency of the pulses. Second pin 15B may be similarly connected to external source 17 such that external source 17 selectively sends signals to second pulse shaver 34 that direct second pulse shaver 34 to shave the enabling pulses in the clock signal.

The combination of first pulse shaver 4 and second pulse shaver 34 may be called a splitter because one phase of the clock signal is shaved by first pulse shaver 4 and an opposing phase of the clock signal is shaved by second pulse shaver 34. In some embodiments, second pulse shaver 34 includes an inverter 36 to invert the enabling pulses before the enabling pulses are shaved by second pulse shaver 34 such that first and second pulse shavers 4, 34 shave opposing phases of the clock signal.

As shown in FIG. 1, the enabling pulses passing through first pulse shaver 4 are delivered to a first set of latches 1C1-NC1, and the enabling pulses passing through second pulse shaver 34 are delivered to a second set of latches 1C2-NC2. The number of latches in the respective first and second set of latches 1C1-NC1, 1C2-NC2 depends on the design of the computer system where clock 2 is located.

FIGS. 2A–2H are timing diagrams illustrating the enabling pulses as waveforms. The enabling pulses are modified as they pass through various components within first pulse shaver 4. The timing diagrams in FIGS. 2A–2H represent a mode of operation where first pin 15A is not directing first pin shaver 4 to shave, or reduce, the enabling pulses in the clock signal.

FIG. 2A shows the signal sysclk 10 after it leaves oscillator 6. In some embodiments, the same signal is sent to first and second pulse shavers 4, 34. FIG. 2B illustrates the signal after it passes through NAND gate 12. FIG. 2C shows the signal after it passes through inverter 14. FIG. 2D illustrates the signal after it passes through NAND gate 16. FIG. 2E describes the signal after it passes through NAND gate 18. FIG. 2F shows the signal after it passes through NAND gate 20. FIG. 2G illustrates the signal after it passes through inverter 22. FIG. 2H describes the signal after it passes through invertor 24 to form signal c1_clk 25 which is delivered to latches 1C1-NC1.

Figure 3A:
FIGS. 3A–3G are timing diagrams similar to FIG. 2A–2H for some of the components shown in FIG. 1 when pulses are being shaved.
Figure 3B:
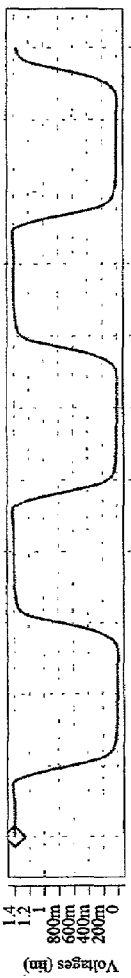
Figure 3C:
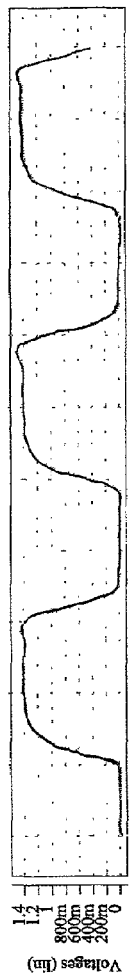
Figure 3D:
Figure 3E:
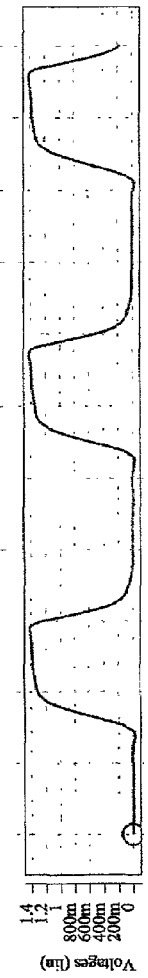
Figure 3F:
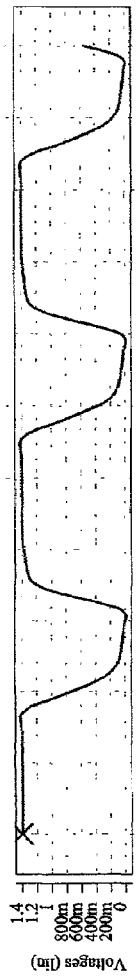
Figure 3G:
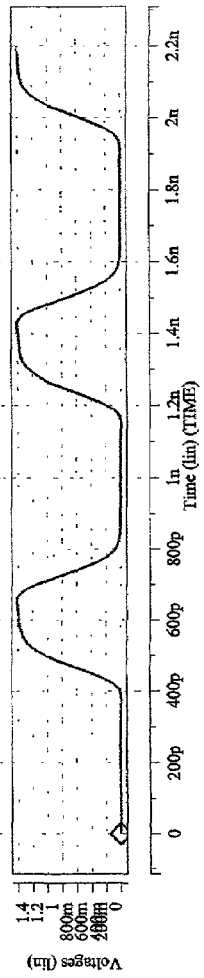

When a min-path problem is detected, first pin 15A selectively delivers a signal to NAND gate 18 such that first pulse shaver 4 reduces the enabling pulse width as described in FIGS. 3A–3G. FIG. 3A again shows the signal sysclk 10 after it leaves oscillator 6. FIG. 3B illustrates the signal after it passes through NAND gate 12. FIG. 3C shows the signal after it passes through inverter 14. FIG. 2D illustrates the signal after it passes through NAND gate 16. The signal from external source 17 effectively disables NAND gate 18 such that the signal delivered through NAND gate 18 stays high. FIG. 3E shows the signal after it passes through NAND gate 20. NAND gates 16 and 20 perform the shaving of the enabling pulses in the clock signal. NAND gate 20 in first pulse shaver 4 preferably does not have a PMOS device connected to the NAND gate 18 output in order to maintain a consistent rising edge delay. FIG. 3F illustrates the signal after it passes through inverter 22. FIG. 3G describes the signal after it passes through invertor 24 to form signal c1_clk 25 which is delivered to latches 1C1-NC1.

Clock 2 ensures that accurate data is communicated through latches 1C1-NC1 and 1C2-NC2 when there is a min-path problem within a computer system that includes clock 2 because first and second pins 15A, 15B selectively direct first and second pulse shavers 4, 34 to reduce enabling pulse widths in the clock signal. Clock 2 can be easily configured to compensate for a wide range of communication delays such that clock 2 is useable in a variety of applications without requiring redesign of a computer system that includes clock 2.

The present invention also relates to a method for synchronizing data flow in a computing system. In some embodiments, the method includes generating pulses with an oscillator 6; selectively reducing the width of the pulses by enabling a first pulse shaver 4 and/or a second pulse shaver 34 to reduce the width of the pulses; and delivering the pulses to a memory element, such as input ports on a first set of latches 1C1-NC1 and/or input ports on a second set of latches 1C2-NC2, without changing the frequency of the pulses.

Selectively reducing the width of the pulses may include detecting a min-path problem in transmitting data through latches 1C1-NC1, 1C2-NC2. In addition, enabling first and second pulse shavers 4, 34 to reduce clock pulse widths may include activating pins 15A, 15B connected to the first and second pulse shavers 4, 34. In some embodiments, enabling second pulse shaver 34 to reduce clock pulse widths may include inverting the pulses before the pulses are shaved by second pulse shaver 34.

Various embodiments of a clock and a method for synchronizing data flow in a computing system have been described. The clock may be located on a single integrated circuit for facilitating error-free communication at high data rates. In another embodiment, the components of the clock may be located on single or multiple integrated circuits and/or single or multiple printed circuit boards. This application is intended to cover any adaptations or variations of the present invention. It is manifestly intended that this invention be limited only by the claims and equivalents thereof.

We claim:

1. A clock for a computing system comprising:
   a first pulse shaver, wherein the first pulse shaver receives a clock signal; and
   a first pin connected to the first pulse shaver to selectively direct the first pulse shaver to reduce a first width of enabling pulses in a first signal generated from the clock signal;
   wherein the first pulse shaver includes a first pulse path, a second pulse path and means for combining signals on the first and second pulse paths, wherein the first pulse path generates a first pulse signal having a first pulse width in response to the clock signal, wherein the second pulse path is connected to the first pin and generates a second pulse signal having a second pulse width in response to the clock signal when enabled by the first pin, and wherein the means for combining generates the first signal generated from the clock signal having a pulse width greater than the first pulse width but less than the second pulse width when enabled by the first pin.

2. The clock of claim 1, further comprising an oscillator to generate the clock signal that is sent to the first pulse shaver.

3. The clock of claim 1, further comprising at least one memory element that receives the enabling pulses from the first pulse shaver.

4. The clock of claim 1, wherein the first pin is connected to an external source that sends a selective signal to the first pulse shaver to enable shaping by the first pulse shaver.

5. The clock of claim 1, further comprising:
   a second pulse shaver, wherein the second pulse shaver receives the clock signal; and
   a second pin connected to the second pulse shaver to selectively direct the second pulse shaver to reduce a second width of the enabling pulses in a second signal generated from the clock signal;

wherein the second pulse shaver includes a third pulse path, a fourth pulse path and means for combining signals on the third and fourth pulse paths, wherein the third pulse path generates a third pulse signal having a third pulse width in response to the clock signal, wherein the fourth pulse path is connected to the second pin and generates a fourth pulse signal having a fourth pulse width in response to the clock signal when enabled by the second pin, and wherein the means for combining generates the second signal generated from the clock signal having a pulse width greater than the second pulse width but less than the fourth pulse width when enabled by the second pin.

6. The computing system of claim 5, wherein the second pulse shaver includes an inverter that inverts the enabling pulses in the clock signal before the enabling pulses in the clock signal are shaved by the second pulse shaver.

7. The clock of claim 5, further comprising:
an oscillator to generate the clock signal that is sent to the first and second pulse shavers;
a first set of memory elements connected to first pulse shaver; and
a second set of memory elements connected to second pulse shaver.

8. The clock of claim 5, wherein the first and second pins are connected to an external source that sends selective signals to the first and second pulse shavers through the first and second pins to direct the first and second pulse shavers to shave the width of the enabling pulses.

9. The clock of claim 1, wherein the first pulse shaver reduces the width of enabling pulses passing through the first pulse shaver without changing the frequency of the clock signal.

10. The clock of claim 1, wherein the first pin selectively enables the first pulse shaver to reduce the width of the enabling pulses when there is a min-path problem in sending data through memory elements connected to the first pulse shaver.

11. A method for synchronizing data flow in a computing system comprising:
generating a clock signal that includes pulses;
selectively reducing the width of the pulses; and
delivering the pulses to a memory element;
wherein selectively reducing the width of the pulses includes:
generating a first pulse signal having a first pulse width in response to the clock signal;
selectively generating a second pulse signal having a second pulse width in response to the clock signal; and
combining the first and second pulse signals to form an enabling pulse, wherein, when generating the second pulse signal, the enabling pulse has a pulse width greater than the first pulse width but less than the second pulse width.

12. The method of claim 11, wherein delivering the pulses to a memory element includes delivering pulses to a latch input.

13. The method of claim 11, wherein generating a clock signal includes generating the clock signal with an oscillator.

14. The method of claim 11, wherein selectively reducing the width of the pulses includes selectively reducing the width of the pulses without changing the frequency of the clock signal.

15. The method of claim 11, wherein selectively reducing the width of the pulses includes detecting a min-path problem in transmitting data through memory elements that receive the pulses.

16. The method of claim 11, wherein selectively reducing the width of the pulses includes directing a first pulse shaver to reduce the width of the enabling pulses.

17. The method of claim 16, wherein selectively reducing the width of the pulses includes directing a second pulse shaver to reduce the width of the enabling pulses.

18. The method of claim 17, wherein directing a second pulse shaver to reduce the width of the enabling pulses includes inverting the pulses before the pulses are shaved by the second pulse shaver.

19. The method of claim 18, wherein directing the first and second pulse shavers to reduce the width of the enabling pulses includes activating a first pin connected to the first pulse shaver and a second pin connected to the second pulse shaver.

20. The method of claim 11, wherein selectively reducing the width of the pulses includes directing a first pulse shaver to reduce the width of the enabling pulses by activating a first pin connected to the first pulse shaver.

* * * * *